(12) United States Patent
Reilly

(10) Patent No.: US 7,147,002 B2
(45) Date of Patent: Dec. 12, 2006

(54) MODULAR MULTI-FUNCTION FLUID FLOW CONTROL DEVICE

(75) Inventor: William J. Reilly, Langhorne, PA (US)

(73) Assignee: Victaulic Company, Easton, PA (US)

( * ) Notice: Subject to any disclaimer, the term of this patent is extended or adjusted under 35 U.S.C. 154(b) by 462 days.

(21) Appl. No.: 10/695,556

(22) Filed: Oct. 28, 2003

(65) Prior Publication Data

US 2005/0087233 A1 Apr. 28, 2005

(51) Int. Cl.
*F16K 21/04* (2006.01)
*E03B 3/18* (2006.01)

(52) U.S. Cl. .............. 137/549; 137/539.5; 137/543.19; 137/549; 251/118; 169/17; 169/22

(58) Field of Classification Search ................ 137/549, 137/539.5, 543.13, 543.19; 251/118; 169/17, 169/20, 22
See application file for complete search history.

(56) References Cited

U.S. PATENT DOCUMENTS

| | | | |
|---|---|---|---|
| 1,949,106 A * | 2/1934 | Manneschmidt, Jr. ....... | 137/495 |
| 3,307,633 A * | 3/1967 | Newall ........................ | 169/22 |
| 3,351,281 A * | 11/1967 | Keil ............................. | 236/56 |
| 4,552,221 A * | 11/1985 | Klein ........................... | 169/22 |
| 4,592,383 A | 6/1986 | Rikuta ....................... | 137/454.6 |
| 4,679,584 A | 7/1987 | Wolff ......................... | 137/269 |
| 4,832,077 A * | 5/1989 | Pilolla ........................ | 137/549 |
| 5,074,329 A | 12/1991 | Havemann et al. ...... | 137/454.6 |
| 5,230,366 A * | 7/1993 | Marandi ..................... | 137/613 |
| 5,392,825 A * | 2/1995 | Mims et al. ............. | 137/614.2 |
| 5,406,974 A | 4/1995 | Griswold ................. | 137/454.6 |
| 5,919,033 A * | 7/1999 | Singleterry et al. ......... | 417/310 |
| 6,467,503 B1 | 10/2002 | Schlesch et al. ............ | 137/597 |

* cited by examiner

*Primary Examiner*—A. Michael Chambers
(74) *Attorney, Agent, or Firm*—Synnestvedt & Lechner LLP

(57) ABSTRACT

A multi-function fluid flow control device is disclosed. A body houses a filter screen, a check valve and an orifice plate mounted on a frame which is removable from the body as a unit through an opening in the body sealed by a removable plug. The orifice plate is removable from the frame to permit different sized orifices to be fitted. An inlet in the body conducts pressurized fluid through the filter screen, through the check valve and then out through an outlet in the body, both the inlet and outlet being adapted for convenient connection to a piping network. An opening in the body in fluid communication with the inlet and sealable by a removable plug allows the screen to be flushed for removal of debris.

15 Claims, 3 Drawing Sheets

US 7,147,002 B2

MODULAR MULTI-FUNCTION FLUID FLOW CONTROL DEVICE

FIELD OF THE INVENTION

This invention relates to fluid control devices that perform multiple functions by incorporating different fluid control components in a single unit.

BACKGROUND OF THE INVENTION

Systems that handle pressurized fluid, such as fire suppression systems for buildings and other structures, often use the pressurized fluid within the system itself to control the operation of system components, particularly valves, that regulate the flow of the pressurized fluid to the system. In the example shown in FIG. 1, a main valve 10 controlling the supply of pressurized water 12 to a piping network 14 of a fire suppression sprinkler system 16 has a flapper component 18 held in the closed position by a latch 20. Latch 20 is held in contact with flapper 18 by a piston 22 operating within a cylinder 24. The piston 22 is biased by a spring 26 and will move away from and release latch 20 in the absence of pressure within the cylinder 24. Cylinder 24 is in fluid communication with the pressurized water supply 12 through a connector tube 28 extending between the high pressure side of the main valve 10 and the cylinder. As long as there is sufficient pressure in cylinder 24 to overcome the biasing force of spring 26, piston 22 is maintained in engagement with latch 20 and the flapper 18 is held closed.

In response to a fire condition, the pressurized water from supply 12 acting on the piston 22 through connector tube 28 is vented through a vent tube 30 that provides fluid communication between the cylinder 24 and various other valves that open in response to the fire condition. This allows pressurized water from supply 12 to flow through connector tube 28, through the cylinder 24 and out through vent tube 30. If the flow from supply 12 to the cylinder 24 is properly throttled so that water flows at a predetermined flow rate, the pressure within the cylinder will drop, allowing piston 22 to move under the biasing force of spring 26 and release the latch 20. The flapper 18 opens and supplies pressurized water to the piping network 14. The water is discharged from the sprinkler system 16 to fight the fire.

When there is no fire, the pressure within the cylinder 24 should be maintained to keep the latch 20 engaged and the flapper 18 closed even if water pressure from the supply 12 is interrupted. A failure to maintain pressure within cylinder 24 in the absence of pressure from supply 12 will allow the main valve 10 to open during a non-fire event, for example, when pressure is restored, and this is not a desired operating characteristic.

It would be advantageous to have a single device that can be used to control the flow of water through connector tube 28 to ensure that piston 22 moves to allow main valve 10 to open in response to a fire condition, and also maintain water pressure within cylinder 24 in the absence of pressure from water supply 12 and thereby avoid false opening of the main valve during a non-fire event.

SUMMARY OF THE INVENTION

The invention concerns a multi-function device for controlling flow of fluid through a conduit. The device comprises a body defining a chamber. An inlet and an outlet are positioned within the body in fluid communication with the chamber. An opening is positioned in the body, providing access to the chamber. A frame, sized to pass through the opening, is positioned within the chamber. The frame is adapted to support a plurality of flow restricting elements within the chamber. At least one flow restricting device is mounted on the frame. A plug sealingly fits within the opening for retaining the frame within the chamber. Preferably, the plug is removable to allow removal and replacement of the frame within the chamber.

One of the flow restricting elements comprises an orifice plate mounted on the frame. The orifice plate has an orifice therethrough for limiting flow through the device to a predetermined flow rate. Preferably, the orifice plate is removably attachable to the frame.

Another flow restricting device is a check valve. The check valve is also mounted on the frame and comprises a seat, a valve closing element movable into and out of sealing engagement with the seat and a biasing member engaging the valve closing element for biasing the valve closing element into engagement with the seat. Preferably, both the orifice plate and the check valve are mounted on the frame. The orifice plate is positioned between the check valve and the outlet and adjacent to the valve closing element and the biasing element is positioned between and engages the orifice plate and the valve closing element for biasing the valve closing element into sealing engagement with the seat. Preferably, a filter element is mounted on the frame and positioned between the inlet and the flow restricting device.

DETAILED DESCRIPTION OF THE EMBODIMENTS

Figure 1:
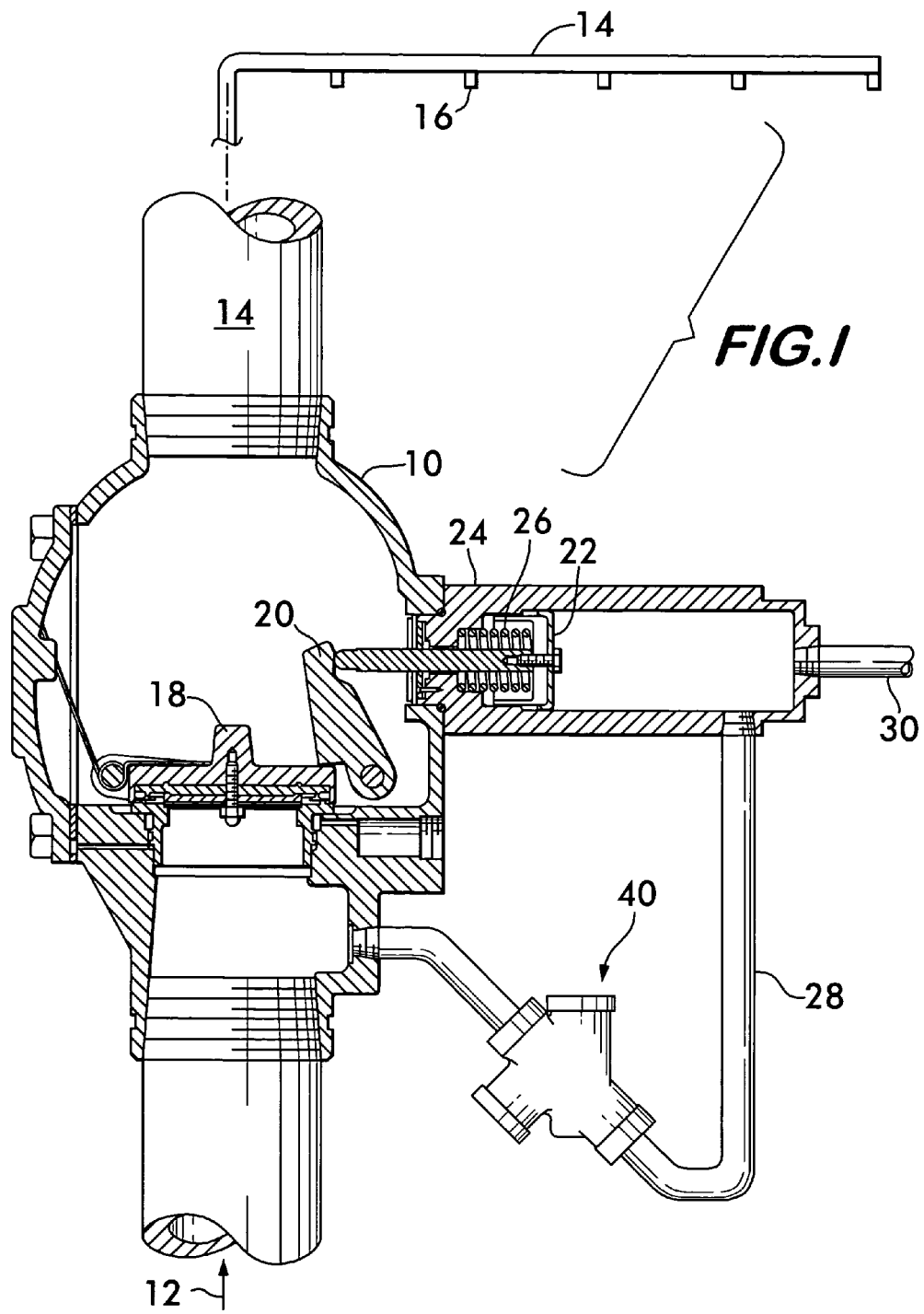
FIG. 1 is a partial sectional view of a main valve controlling flow of water to a fire suppression sprinkler system, the valve incorporating a modular, multi-function fluid flow control device according to the invention, shown schematically.

FIG. 1 shows a multi-function fluid flow control device 40 positioned in line with the connector tube 28 of a main valve 10 controlling water flow from a source of pressurized water 12 to a fire suppression sprinkler system 16 described in detail above. It should be understood that the device 40 is useable within any fluid flow control system with any fluid, the fire suppression system being used by way of example.

Figure 2:
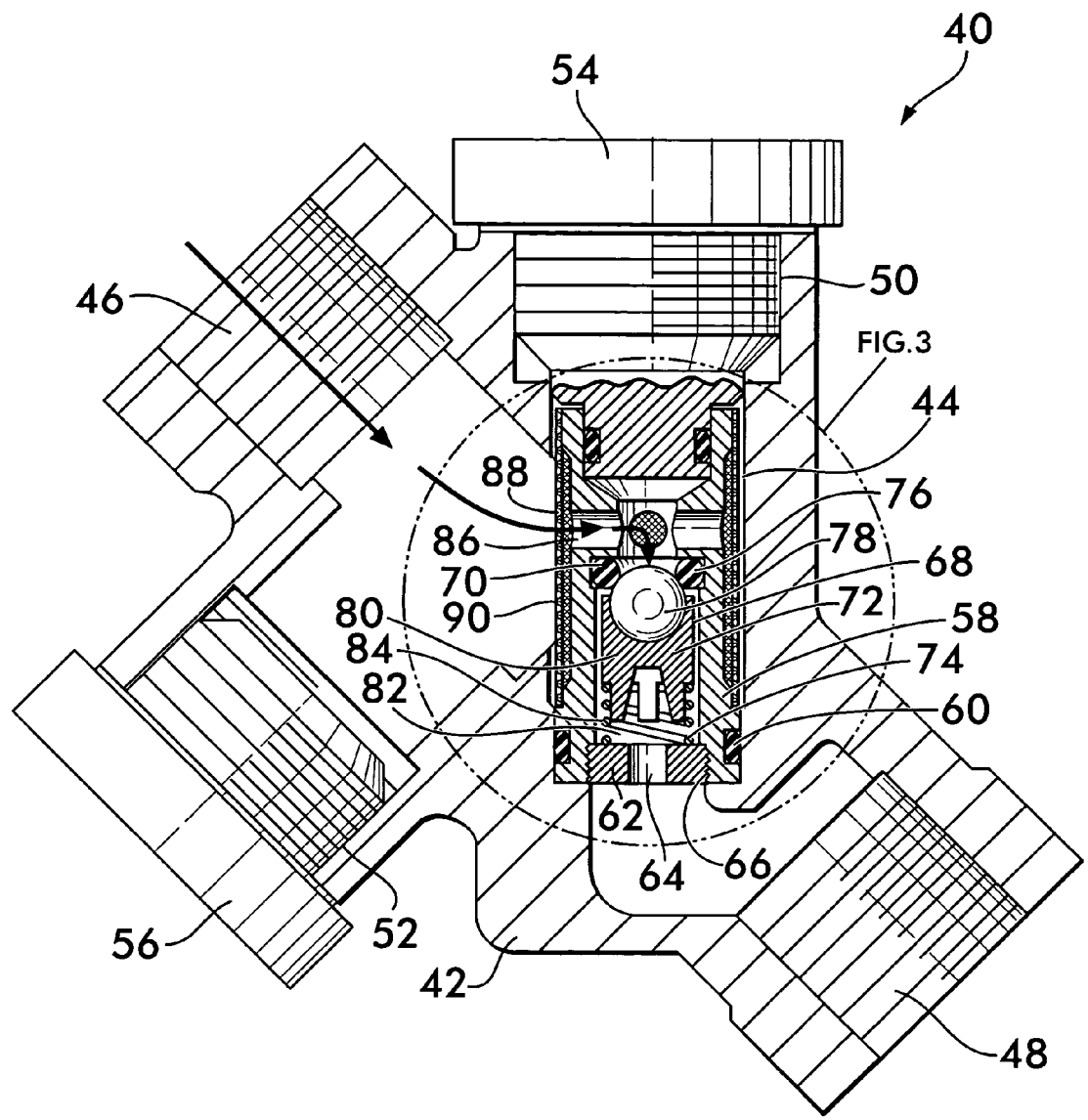
FIG. 2 is a longitudinal sectional view of the multi-function fluid flow control device.

FIG. 2 shows the multi-function fluid flow control device 40 in detail. Device 40 comprises a body 42 that defines a chamber 44. An inlet 46 provides fluid communication with the chamber 44 as does an outlet 48, preferably positioned opposite the inlet. The inlet 46 and outlet 48 are adapted to connect the device 40 into a piping network and may be threaded as shown, or sized for soldering, brazing or for receiving a mechanical coupling. The co-linear positioning of inlet 46 and outlet 48 facilitates integration of device 40 into a straight pipe run, although other relative positioning of the inlet and outlet are also feasible, for example, angularly with respect to one another.

Two further openings 50 and 52 are positioned within body 42. Opening 50 provides access to chamber 44 and is sized to permit flow restricting elements (described below) to be positioned within the chamber. Opening 52 is in fluid communication with inlet 46 and serves as a flush port to allow the device to be cleaned of debris. Both openings are sealed with respective removable plugs 54 and 56 which sealingly engage the body 42 to provide a fluid tight closure to each opening.

The body 42 preferably comprises cast iron and is machined to form the inlet, chamber, outlet and openings. The body may also be molded from various engineering plastics.

A frame 58 is positioned within chamber 44. The frame 58 is insertable and removable through opening 50 and provides a mounting for positioning a plurality of flow restricting devices (described below) within the chamber 44. A seal 60, preferably an o-ring, is positioned between the frame 58 and the body 42 within the chamber 44. Seal 60 prevents fluid from passing from the chamber 44 to the outlet 48 by passing between the body 42 and the frame 58.

An orifice plate 62 is mountable on frame 58. Orifice plate 62 has an orifice 64 therethrough sized to limit the flow of fluid through the device 40 to a predetermined flow rate. This predetermined flow rate is tailored to the specific needs of the particular system in which the device 40 is incorporated, a specific example being provided below. The orifice plate 62 is preferably mounted on frame 58 so as to discharge fluid directly to the outlet 48. The orifice plate 62 is preferably removably mounted on the frame, for example by screw threads 66, to allow it to be replaced rapidly and easily. This facilitates tuning the fluid system for optimum performance by allowing different sized orifices to be tried until the desired predetermined flow rate is achieved. Furthermore, if the system parameters change, the flow rate of fluid through the device can be readily adjusted to accommodate the new system parameters by simply changing the orifice plate 62 for another plate with a different sized orifice.

A check valve 68 is positioned within frame 58, preferably between the orifice plate 62 and the inlet 46. Check valve 68 comprises a valve seat 70 and a movable valve closing element 72 urged into sealing engagement with the seat 70 by a biasing member 74. Preferably the seat 70 comprises a ring 76 formed of a durable, compliant material such as an elastomer. The valve closing element 72 is shown by way of example as a ball 78 captured at the end of a slider 80 that slides within a bore 82 defined by the frame 58. For economy of design the biasing member 70 comprises a coil spring 84 that engages the orifice plate 62 and the slider 80 to urge ball 78 into sealing engagement with ring 76. A plurality of ducts 86 through the frame 58 provide fluid communication between the inlet 46 and the bore 82. As is typical for check valves, fluid will flow through the valve 68 from the inlet 46 to the outlet 48 when fluid pressure within the inlet 46 exerts sufficient force on the valve closing element 72 to overcome the biasing force of the biasing member 74 and unseat the closing element 72 from the valve seat 70. Fluid flow in the opposite direction, i.e., into the chamber 44 from the outlet 48 is prevented because such a flow will tend to force the valve closing element 72 into more forceful engagement with seat 70 and thereby maintain the valve closing element 72 in the closed position. The frame 58 is held securely within chamber 44 by plug 54 which also sealingly engages opening 50 to prevent leakage from the device 10.

To prevent debris within the fluid from fouling the check valve 68 or the orifice 64, a filter element 88 is positioned between the inlet and the chamber 44. Preferably, filter element 88 is a wire mesh screen 90 that surrounds the frame 58. The screen 90 comprises stainless steel wire to mitigate corrosion.

Figure 3:
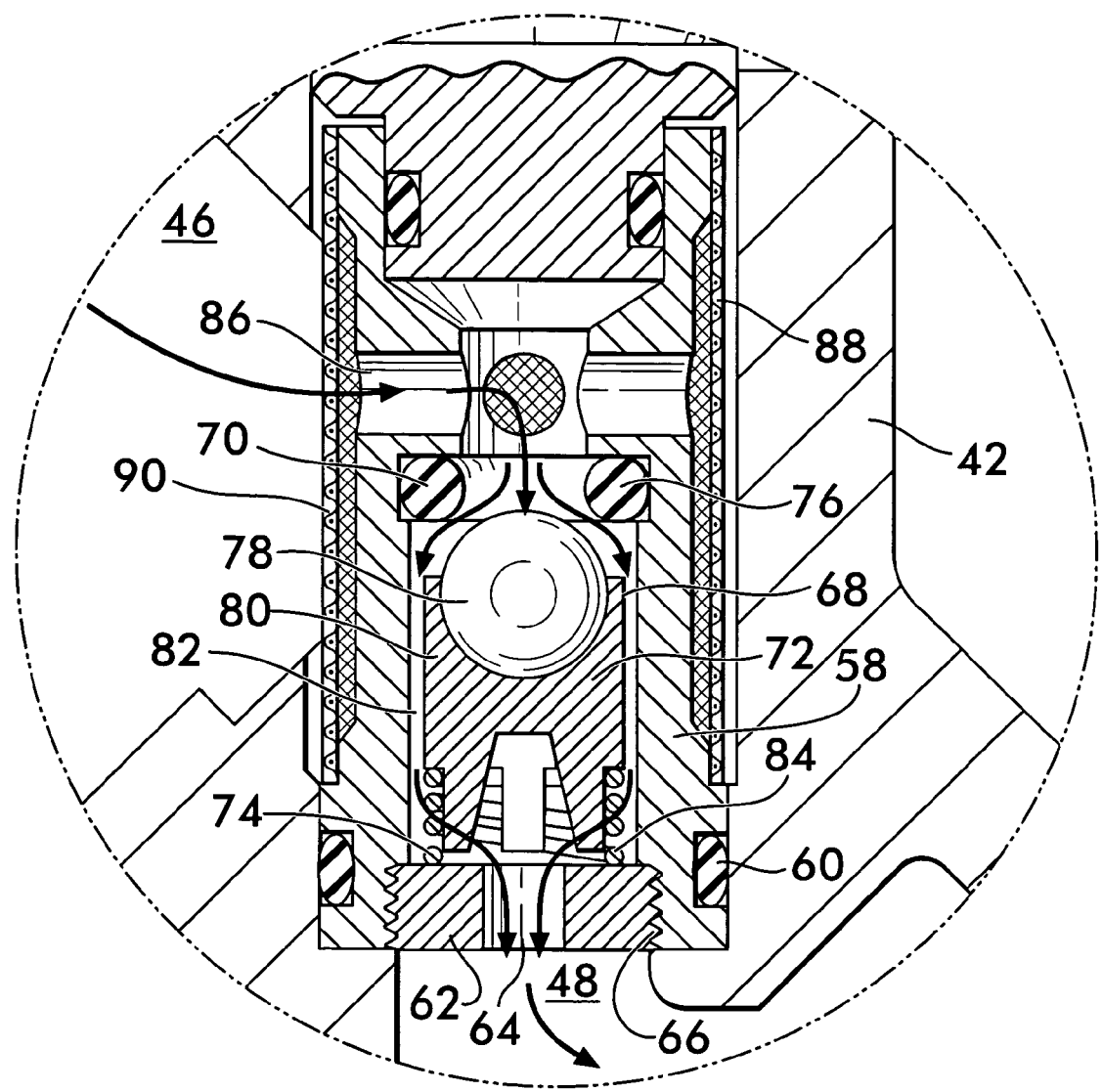
FIG. 3 is a detailed view, on an enlarged scale, of a portion of the device shown within the broken line circle in FIG. 2.

Operation of the multi-function fluid flow control device 40 is described by way of example with reference to FIGS. 1–3 for a fire suppression sprinkler system 16 using water as the working fluid. As shown in FIG. 1, for the system in the ready condition, pressurized water from supply 12 is closed off from the sprinkler piping network 14 by main valve 10. Flapper 18 of main valve 10 is held closed by latch 20. The latch 20 is held in engagement with flapper 18 by piston 22 operating within cylinder 24. Water pressure within cylinder 24 acts on piston 22 to overcome the biasing force of spring 26 and keep it engaged with latch 20. The water pressure to cylinder 24 is supplied by connector tube 28 providing fluid communication between the pressurized water supply 12 and the cylinder 24. Vent tube 30, also in fluid communication with water supply 12 through its connection to cylinder 23, is closed off by a valve (not shown). The multi-function fluid flow control device 40 is connected in line with the connector tube between the water supply 12 and the cylinder 24. Device 40 is oriented so that its check valve 68 (described above) allows water flow from the supply 12 to the cylinder 24, but not in the reverse direction.

In response to a fire condition, the valve which closes off vent tube 30 is opened. This vents the pressure from the vent tube 30 and allows water to flow from the supply 12 through the connector tube 28, through the device 40 and into the cylinder 24. As shown in FIG. 2, water flows into inlet 46, past filter element 88 and through ducts 86 in frame 58. As shown in FIG. 3, the pressure of the water unseats ball 78 from ring seat 76, moving the slider 80 within bore 82 against the biasing force of spring 84 thereby opening check valve 68. Water flows through bore 82, past ball 78, slider 80 and spring 84 where it encounters orifice plate 62. Orifice 64 in orifice plate 62 throttles the flow, thereby limiting the flow rate through the device 40 to a predetermined value that will allow the pressure to drop within cylinder 24 sufficiently so that biasing spring 26 can move piston 22 out of engagement with latch 20. In the absence of restraint from piston 22, latch 20 releases flapper 18, which opens in response to pressure from the supply 12 allowing water to flow through piping network 14 to sprinkler system 16.

In the event of a loss of supply pressure, the check valve 68 within the device 40 maintains the system pressure within cylinder 24 by preventing any retrograde flow through the connector tube 28 from the cylinder 24 to the main valve 10. Otherwise, a loss of supply pressure would relieve the pressure within the cylinder 24 and allow the main valve 10 to open in the absence of a fire condition.

During routine maintenance, the filter element 88 may be flushed clean of debris by removing plug 56 (see FIG. 2). This will allow water to flow past the filter element and out through opening 52, carrying the debris with it.

If it is desired to service the flow restricting devices, for example, to replace a malfunctioning check valve 68 or substitute an orifice plate 62 with a different sized orifice 64 the plug 54 is removed and the frame 58 is withdrawn from chamber 44 through opening 50. The orifice plate 62 may then be removed from the frame 58 by unscrewing it, the slider 80, ring seat 76, ball 78 and spring 84 can be removed and replaced, and/or a different orifice plate 62 with a different sized orifice 64 can be installed. The frame 58 may then be inserted back within the chamber 44 and the plug 54 engaged to reseal the opening 50 and hold the frame 58 in the chamber 44.

Modular multi-function fluid flow devices according to the invention provide versatility and adaptability to the design of pressurized fluid flow systems by allowing a single device to perform multiple functions of flow regulation and having easily interchangeable parts which permit precise and rapid tuning of system parameters to optimize system performance.

What is claimed is:

1. A device for controlling flow of fluid through a conduit, said device comprising:
   a body defining a chamber;
   an inlet positioned within said body in fluid communication with said chamber;
   an outlet positioned within said body in fluid communication with said chamber;
   an opening positioned in said body providing access to said chamber;
   a frame sized to pass through said opening for positioning within said chamber, said frame being adapted to support a plurality of flow restricting elements within said chamber;
   an orifice plate mounted on said frame, said orifice plate having an orifice therethrough for limiting flow through said device to a predetermined flow rate; and
   a plug sized to sealingly fit within said opening for retaining said frame within said chamber.

2. A device according to claim 1, wherein said orifice plate is removably attachable to said frame.

3. A device according to claim 1, wherein said flow restricting device is a check valve comprising:
   a seat;
   a valve closing element movable into and out of sealing engagement with said seat; and
   a biasing member engaging said valve closing element for biasing said valve closing element into engagement with said seat.

4. A device according to claim 3, further comprising:
   an orifice plate mounted on said frame, said orifice plate having an orifice therethrough for limiting flow through said device to a predetermined flow rate, said orifice plate being positioned between said check valve and said outlet and adjacent to said valve closing element; and
   a biasing element positioned between and engaging said orifice plate and said valve closing element for biasing said valve closing element into sealing engagement with said seat.

5. A device according to claim 4, wherein said orifice plate is removably attachable to said frame.

6. A device according to claim 1, further comprising a filter element mounted on said frame and positioned between said inlet and said flow restricting device.

7. A device according to claim 6, further comprising:
   a second opening in said body in fluid communication with said inlet and said chamber; and
   a second plug sized to sealingly fit within second opening, said second plug being removable to permit fluid to flow from said inlet, through said chamber and out of said opening thereby flushing said filter element.

8. A device for controlling flow of fluid through a conduit, said device comprising:
   a body defining a chamber;
   an inlet positioned within said body in fluid communication with said chamber;
   an outlet positioned within said body in fluid communication with said chamber;
   a check valve positioned within said chamber between said inlet and said outlet and configured to permit flow only from said inlet, through said chamber and through said outlet;
   a filter element positioned within said chamber between said inlet and said outlet;
   an orifice plate positioned within said body between said inlet and said outlet, said orifice plate having an orifice therethrough for limiting flow through said device at a predetermined flow rate;
   an opening positioned in said body providing access to said chamber, said opening being sized to permit removal and insertion of said check valve and said orifice plate from said chamber; and
   a plug sized to sealingly fit within said opening and retain said check valve and said orifice plate within said chamber.

9. A device according to claim 8, wherein said filter element is disposed between said inlet and said check valve.

10. A device according to claim 9, wherein said orifice plate is positioned between said check valve and said outlet.

11. A device according to claim 8, wherein said check valve comprises:
    a valve seat;
    a valve closing element movable into and out of engagement with said valve seat, said orifice plate being positioned adjacent to said valve closing element; and
    a biasing member for biasing said valve closing element into engagement with said valve seat, said biasing member being positioned between and engaging both said orifice plate and said valve closing element.

12. A device according to claim 8, further comprising a frame positionable within said chamber, said check valve, said filter element and said orifice plate being mountable on said frame, said frame being removable from said chamber through said opening, said check valve, said orifice plate and said filter element being removable from said chamber with said frame.

13. A device according to claim 12, wherein said orifice plate is removably mounted on said frame.

14. A device according to claim 12, wherein said filter element is positioned surrounding said frame.

15. A device according to claim 9, further comprising:
    an opening in said body in fluid communication with said inlet and said chamber; and
    a plug sized to sealingly fit within said opening, said plug being removable to permit fluid to flow from said inlet, through said chamber and out of said opening thereby flushing said filter element.

* * * * *